United States Patent

[11] 3,580,320

| [72] | Inventor | Warren A. Roberts<br>514 Clinton St., Redwood City, Calif. 94062 |
|---|---|---|
| [21] | Appl. No. | 763,771 |
| [22] | Filed | Sept. 30, 1968 |
| [45] | Patented | May 25, 1971 |

[54] ADAPTORS FOR USE IN TIRE CHANGING AND WHEEL BALANCING
15 Claims, 8 Drawing Figs.

[52] U.S. Cl. .................................................... 157/1.24,
144/288, 73/487
[51] Int. Cl. ................................................... B60c 25/06
[50] Field of Search .......................................... 157/1, 1.1,
1.17, 1.22, 1.24, 1.26; 144/288—1; 73/483, 485, 487

[56] References Cited
UNITED STATES PATENTS

| 2,816,446 | 12/1957 | Palmer | 43/483 |
| 3,211,206 | 10/1965 | Garthe | 157/1.24 |
| 3,349,626 | 10/1967 | Palacios | 73/487 |
| 3,474,840 | 10/1969 | Scott | 144/288 |

*Primary Examiner*—Granville Y. Custer, Jr.
*Attorney*—Roland I. Griffin

ABSTRACT: A circular plate is provided with pins on one side for engaging lug holes of a Volkswagon wheel and is provided with pins on the other side for engaging lug holes of an eight-lug Pontiac wheel. The plate is also provided with a central hole for receiving the locking mechanism of a tire changer or the balancing head of a bubble wheel balancer. In addition, the plate may be provided with holes for receiving the hub cap retaining clips of the Volkswagon wheel and the spring-stop mechanism of a tire changer to provide a dual wheel mounting adapter for use in tire changing. Alternatively, the plate may be evenly balanced in weight about its central hole to provide a dual wheel mounting adapter for use in wheel balancing.

PATENTED MAY 25 1971 3,580,320

INVENTOR.
WARREN A. ROBERTS
BY Roland D. Griffin
ATTORNEY

PATENTED MAY 25 1971 3,580,320

INVENTOR.
WARREN A. ROBERTS
BY *Roland D. Griffin*
ATTORNEY

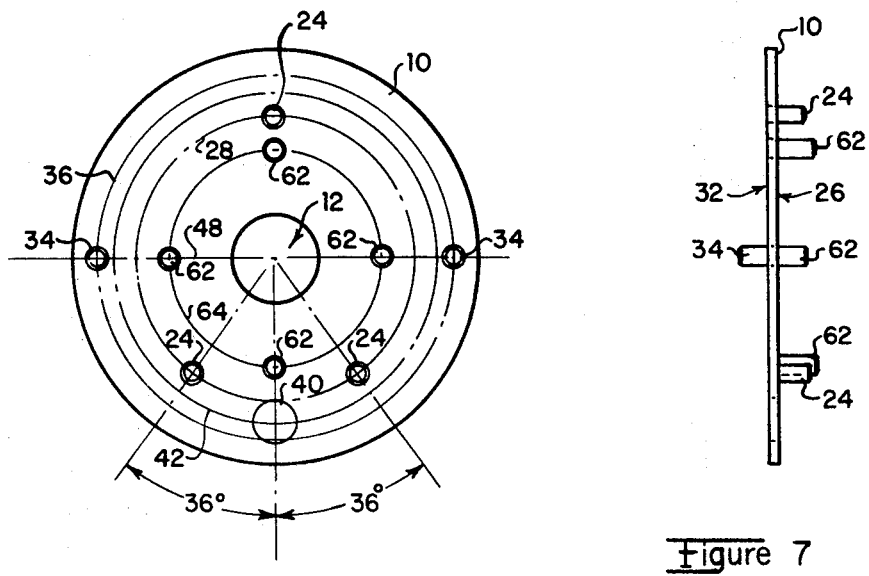
Figure 6
Figure 7
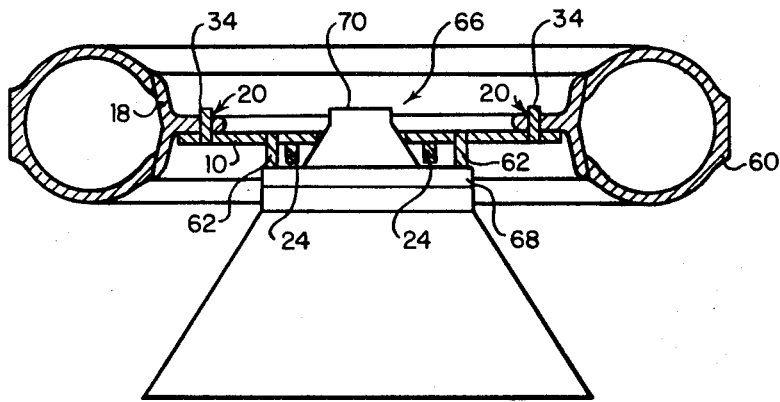
Figure 8

3,580,320

ADAPTORS FOR USE IN TIRE CHANGING AND WHEEL BALANCING

BACKGROUND AND SUMMARY OF THE INVENTION

This invention relates to adapters for use in mounting wheels, such as Volkswagon and eight-lug Pontiac wheels, on conventional tire changers and bubble wheel balancers.

In most conventional automobiles the wheel retaining lugs are mounted in a circular pattern closely encircling the axle or axle extension. The wheels for these automobiles are therefor provided with rims having a corresponding pattern of lug holes closely encircling a corresponding circular axle clearance hole, as shown in FIG. 1. Consequently, the locking mechanisms of most of the conventional tire changers and the balancing heads of most of the conventional bubble wheel balancers are adapted for wheels having such rims.

The wheel retaining lugs of Volkswagon automobiles and also of Pontiac automobiles having an eight-lug wheel are mounted in a larger circular pattern more loosely encircling the axle or axle extension than the wheel retaining lugs of most other conventional automobiles. Typically, the wheels for these Volkswagon and Pontiac automobiles are provided with rims having a corresponding pattern of lug holes arranged around a noncircular axle clearance hole at least two or three times larger in area than the circular axle clearance hole of most other conventional automobile wheels, as shown for an eight-lug Pontiac wheel in FIG. 2.

Due to their comparatively large, noncircular axle clearance holes, Volkswagon and eight-lug Pontiac wheels cannot be properly mounted on many of the conventional tire changers and bubble wheel balancers. These tire changers and bubble wheel balancers therefore cannot be used effectively, if at all, on Volkswagon and eight-lug Pontiac wheels. Moreover, an operator attempting to use one of these conventional tire changers on a Volkswagon or eight-lug Pontiac wheel that is improperly mounted on the tire changer may bend or otherwise damage the rim of the wheel. Thus, the operations of balancing and changing tires on Volkswagon and eight-lug Pontiac wheels may often have to be performed by hand without the aid of a time saving tire changer or bubble wheel balancer.

Accordingly, it is the principal object of this invention to provide a wheel mounting adapter for quickly and properly mounting both Volkswagon and eight-lug Pontiac wheels on nearly all conventional tire changers and to provide another adapter for quickly and properly mounting both of these wheels on nearly all conventional bubble wheel balancers.

Another object of this invention is to provide an improved and inexpensive wheel mounting adapter that is simple to make and use and safe both to the operator using it and to the wheel on which it is used.

These and other objects, which will become apparent from a reading of this specification and an inspection of the accompanying drawings, are accomplished according to the illustrated embodiments of this invention by fixedly mounting three pins on one side of a circular plate to engage generally oppositely facing lug holes to a Volkswagon wheel and by fixedly mounting two pins on the other side of the plate to engage oppositely facing lug holes of an eight-lug Pontiac wheel. The circular plate is made to rest completely upon the inner bell of the rim of the Volkswagon wheel and to fit within the rim and completely over all eight lug holes of the eight-lug Pontiac wheel. It is also provided with a central clearance hole for engaging the locking mechanism of a conventional tire changer or the balancing head of a conventional bubble wheel balancer. An adapter for mounting Volkswagon (some Porsche) and eight-lug Pontiac wheels on nearly any conventional tire changer may be provided by providing the circular plate with additional holes for receiving the spring-stop mechanisms of these tire changers and the hub cap retaining clips of the Volkswagon wheel. Another adapter for mounting these wheels on nearly any conventional bubble wheel balancer may be provided by fixedly mounting additional pins on the circular plate to provide support during the balancing of an eight-lug Pontiac wheel and by evenly balancing the weight of the plate about its central clearance hole.

DESCRIPTION OF THE DRAWINGS

FIG. 6 is a plan view of the preferred embodiment of an adapter for mounting both Volkswagon (some Porsche) and eight-lug Pontiac wheels on nearly any conventional bubble wheel balancer.

FIG. 7 is a side view of the adapter of FIG. 6.

FIG. 8 is a sectional elevational view showing how the adapter of FIGS. 6 and 7 is employed to mount an eight-lug Pontiac wheel on a conventional wheel balancer.

DESCRIPTION OF THE PREFERRED EMBODIMENTS

Figure 1:
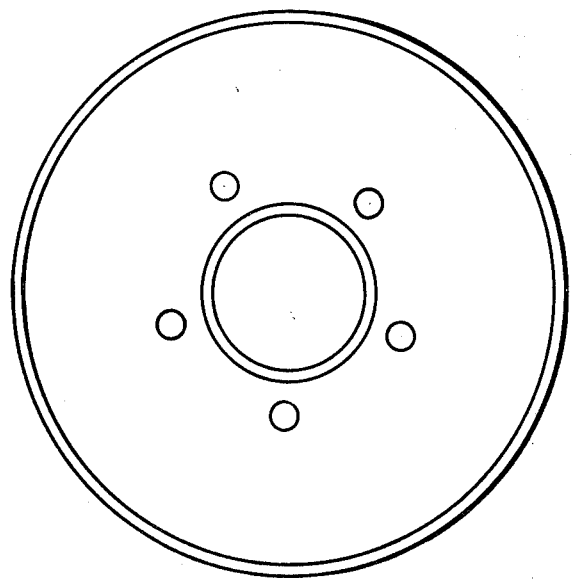
FIG. 1, already referred to above, is a plan view of a conventional automobile wheel.
Figure 2:
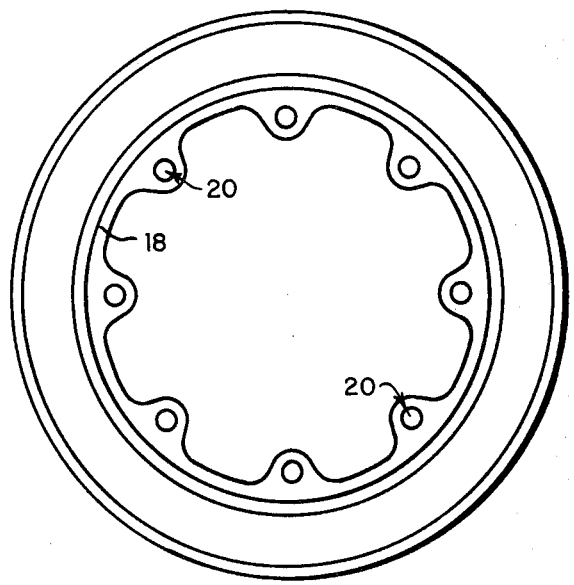
FIG. 2, also referred to above, is a plan view of an eight-lug Pontiac wheel.
Figure 3:
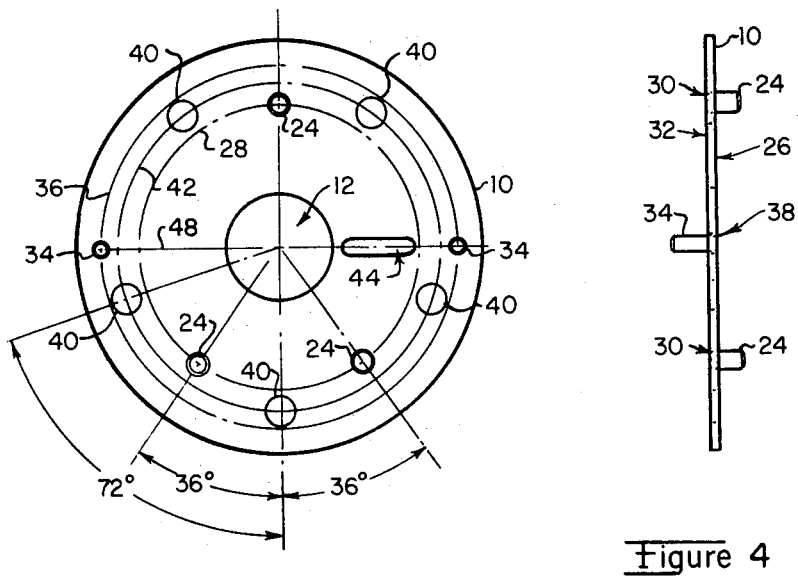
FIG. 3 is a plan view of the preferred embodiment of an adapter for mounting Volkswagon (some Porsche) and eight-lug Pontiac wheels on nearly any conventional tire changer.
Figure 4:
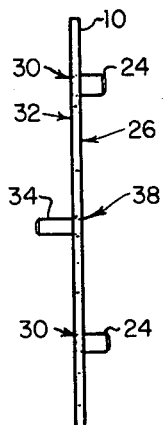
FIG. 4 is a side view of the adapter of FIG. 3.
Figure 5:
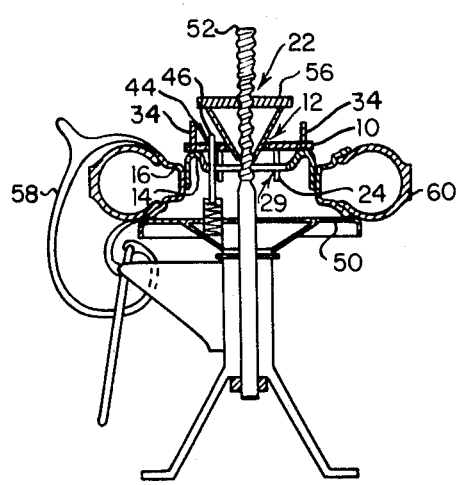
FIG. 5 is a sectional elevation view showing how the adapter of FIGS. 3 and 4 is employed to mount a Volkswagon wheel on a conventional tire changer.

In the description that follows the actual dimensions of wheel mounting adapters constructed in accordance with the principles of this invention are given in parentheses. Referring now to FIGS. 3 and 4, there is shown a circular plate 10 (one-quarter inch in thickness and 11½ inches in diameter) with a circular central hole 12 (3 inches in diameter) concentrically passing through it. Circular plate 10 is stamped or otherwise made from a high tensile alloy steel such as 4,140 to withstand the rough treatment normally given tire changing equipment. It is made to rest completely upon the inner bell 14 of the rim 16 of a Volkswagon wheel, as shown in FIG. 5, and to fit within the rim 18 and completely over all eight-lug holes 20 of an eight-lug Pontiac wheel, as shown in FIG. 8, while in either case being engaged through its central hole 12 by the central locking mechanism 22 of almost any conventional tire changer, as illustrated in FIG. 5.

Three pins 24 are fixedly mounted on one side 26 of circular plate 10 along a circle 28 (8 1/16 inches in diameter) at the angularly spaced positions indicated in FIG. 3 for engaging three Volkswagon wheel lug holes 29, one of which faces generally opposite the other two. (See FIG. 5.) Pins 24 (five-eighths of an inch in diameter and fifteen-sixteenths of an inch long with a chamfer of one-sixteenth of an inch at each end) may be fixedly mounted on circular plate 10 by press-fitting them from side 26 into holes 30 (one and one-half thousandths of an inch less in diameter than pins 24) until they are flush with the other side 32 of the circular plate. Similarly, two pins 34 are fixedly mounted on side 32 of circular plate 10 along a circle 36 (10 ¼ inches in diameter) at the angularly spaced position indicated in FIG. 3 for engaging two oppositely facing lug holes 20 of an eight-lug Pontiac wheel, as shown in FIG. 8. Pins 34 (one-half inch in diameter and 1¼ inches long with a chamfer of one-sixteenth of an inch at each end) may also be fixedly mounted on circular plate 10 by press-fitting them from side 32 into holes 38 (one and one-half thousandths of an inch less in diameter than pins 34) until they are flush with the other side 26 of the circular plate. All of the pins 24 and 34 are made from a high tensile alloy steel such as 4,140. The mounting holes 30 and 38 for these pins 24 and 34 may be drilled through circular plate 10.

Five holes 40 (1 inch in diameter) are drilled through circular plate 10 along a circle 42 (9 ¼ inches in diameter) at the angularly spaced positions indicated in FIG. 3 for receiving the hub cap retaining clips of a Volkswagon wheel to prevent them from being bent or broken during tire changing. A slot 44 (2 inches long and five-eights of an inch wide with semicircular ends) for receiving the offcenter spring-stop mechanism 46 (see FIG. 5) of almost any conventional tire changer is also drilled or stamped through circular plate 10 between the central hole 12 and the circle 28 and (1 ⅞ inches from the center of hole 12) along a diametrical line 48 passing through the centers of hole 12 and of the mounting holes for pins 34.

The above-described adapter may be used for quickly and properly mounting either a Volkswagon wheel (and some Porsche wheels) or an eight-lug Pontiac wheel on nearly any conventional tire changer, such as, for example, a JOHN BEAN MAY TIRE-MATIC M-62B, a COATS 505-19,677, or a BIG 4 XP100-B. As illustrated in FIG. 5 for a Volkswagon wheel and one commonly used type of tire changer, the wheel is placed on the base 50 of the tire changer, and the side 26 of circular plate 10 is placed upon the inner bell 14 of the rim 16 with holes 40 receiving the hub cap retaining clips mounted on rim 16, central hole 12 receiving the threaded shaft 52 of the locking mechanism 22 of the tire changer, and pins 24 protruding into three generally oppositely facing lug holes 29 of rim 16. The spring-stop mechanism 46 of the tire changer is brought into engagement with circular plate 10 through slot 44, and the threaded locking cone 56 of the locking mechanism 22 of the tire changer is screwed down on threaded shaft 52 into engagement with circular plate 10 through central hole 12. This locks the Volkswagon wheel firmly in place while the bead breaking tool 58 of the tire changer and other tools are used to facilitate replacing the tire 60 mounted on the rim 16 or repairing or replacing an inner tube. The adapter is used in the same way with an eight-lug Pontiac wheel except that the side 32 of circular plate 10 is placed within the rim 18 completely over all eight lug holes 20 with pins 34 protruding into two oppositely facing lug holes 20.

The adapter of FIGS. 3 and 4 may also be modified to make it useful for quickly and properly mounting either a Volkswagon wheel (and some Porsche wheels) or an eight-lug Pontiac wheel on nearly any conventional bubble wheel balancer. This may be done by symmetrically drilling or stamping two slots 44 through circular plate 10 along the diametrical line 48 on opposite sides of the central hole 12 and by enlarging the single hole 40 between the two closest pins 24 to evenly balance the weight of the adapter about its center.

It may be desirable, however to employ a separate adapter for wheel balancing. Such an adapter is shown in FIGS. 6 and 7, where the structural features corresponding to those of FIGS. 3 and 4 are indicated by the same reference numerals employed in FIGS. 3 and 4. A circular plate 10 is again provided with a circular central hole 12, three pins 24, and two pins 34 in the same manner as described above for the tire changing adapter of FIGS. 3 and 4. However, in order to reduce the possible play in a wheel supported by this wheel balancing adapter, pins 24 (twenty-three thirty-seconds of an inch in diameter and seven-eights of an inch in length) and pins 34 (nineteen thirty-seconds of an inch in diameter and seven-eights of an inch in length) are employed that fit more tightly into the lug holes of the corresponding Volkswagon and eight-lug Pontiac wheels than is necessary for the pins 24 and 34 of the tire changing adapter of FIGS. 3 and 4.

The circle 28 along which the three pins 24 of the wheel balancing adapter are mounted is about equal to the outer diameter of the balancing heads of some conventional bubble wheel balancers. Four additional pins 62 (one-half inch in diameter and 1 inch in length) are therefore fixedly mounted on side 26 of circular plate 10 along a smaller circle 64 (6 ⅛ inches in diameter) at the angularly spaced positions indicated in FIG. 6. These pins may be mounted on plate 10 in the same manner as described above for the pins 24 of the tire changing adapter of FIGS. 3 and 4. They serve to positively support the circular plate 10 of the wheel balancing adapter on the base 68 of the balancing head 66 of a conventional bubble wheel balancer during the balancing of an eight-lug Pontiac wheel. (See FIG. 8.) Such support pins 62 are not required on the side 32 of circular plate 10, since the diameter of the circle 36 along which the two pins 34 are mounted is substantially larger than the outer diameter of the balancing heads 66 of most conventional bubble wheel balancers. Thus, during the balancing of a Volkswagon wheel the side 32 of circular plate 10 may rest directly against the base 68 of the balancing head 66 of such a bubble wheel balancer.

The wheel balancing adapter does not have a slot 44 for receiving the spring-stop mechanism of a tire changer, and it has only one hole 40 enlarged (to about 1 9/64 inches in diameter) and positioned on the circle 42 midway between the closest pins 24 to evenly balance the weight of the adapter about its central hole 12. Holes 40 are not required for receiving the hub cap retaining clips of a Volkswagon wheel, since the inner side of the wheel is placed in abutment with the circular plate 10 of this adapter during the wheel balancing operation. The additional load added to a bubble wheel balancer by this adapter is minimized by reducing the thickness of circular plate 10 (to three-sixteenths of an inch) and by making circular plate 10 and pins 62, 24 and 34 from aluminum rather than steel.

The adapter of FIGS. 6 and 7 may be used for quickly and properly mounting either a Volkswagon wheel (and some Porsche wheels) or an eight-lug Pontiac wheel on nearly any conventional bubble wheel balancer. As illustrated in FIG. 8, for an eight-lug Pontiac wheel and an ATLAS M-60 bubble wheel balancer, the wheel is supported on the base 68 of the balancing head 66 of the bubble wheel balancer by the adapter plate. A spring-biased cone 70 of the balancing head engages the adapter through its central opening 12 and thereby retains the adapter in the proper position on the base 68 of the balancing head. The pins 34 of the adapter protrude into two oppositely facing lug holes 20 of the rim 18 and thereby hold the wheel in the proper position on the balancing head 66 during the wheel balancing operation.

I claim:

1. A wheel mounting adapter comprising:
   a circular plate having a central hole therein for mounting the plate on a wheel handling device;
   a first plurality of means fixedly mounted on one side of said plate at angularly spaced positions along a first circle for engaging a plurality of lug holes in the rim of a wheel when the wheel and the adapter are placed in abutment upon the wheel handling device; and
   a second plurality of means fixedly mounted on the other side of said plate at angularly spaced positions along a second circle for engaging a plurality of lug holes in the rim of a different wheel when that wheel and the adapter are placed in abutment upon the wheel handling device.

2. A wheel mounting adapter as in claim 1 wherein:
   said first plurality of means comprises at least three pins for engaging at least three lug holes of a Volkswagon or Porsche wheel, one of said pins being mounted on said first circle generally opposite the other two for engaging one lug hole positioned generally opposite two others; and
   said second plurality of means comprises at least two pins for engaging at least two lug holes of an eight-lug Pontiac wheel, one of said pins being mounted on said second circle generally opposite the other for engaging one lug hole positioned generally opposite another lug hole.

3. A wheel mounting adapter as in claim 2 including a plurality of holes in said plate angularly spaced along a third circle between said first and second circles to receive hub cap retaining clips mounted on the Volkswagon wheel when the Volkswagon wheel and the adapter are placed in abutment upon the wheel handling device.

4. A wheel mounting adapter as in claim 3 wherein:
   said wheel handling device is a tire changer having a central locking mechanism and an offcenter stop mechanism;
   the central hole in said plate is adapted for engaging the central locking mechanism of the tire changer when a wheel and the adapter are placed in abutment upon the tire changer; and said plate has another hole positioned between the central hole and the first circle for engaging the offcenter stop mechanism of the tire changer when a wheel and the adapter are placed in abutment upon the tire changer.

5. A wheel mounting adapter as in claim 4 wherein said plate and said pins are made of steel.

6. A wheel mounting adapter as in claim 3 wherein:
said wheel handling device is a wheel balancer having a central balancing mechanism;
the central hole in said plate is adapted for engaging the central balancing mechanism of the wheel balancer when a wheel and the adapter are placed in abutment upon the wheel balancer; and
said plate and said pins are balanced in weight around the central hole in the plate.

7. A wheel mounting adapter as in claim 6 wherein a third plurality of pins is fixedly mounted on said one side of said plate at angularly spaced positions within said first circle to help support the adapter on the central balancing mechanism of the wheel balancer when an eight-lug Pontiac wheel is being balanced.

8. A wheel mounting adapter as in claim 7 wherein said plate and said pins are made of aluminum.

9. A wheel mounting adapter as in claim 1 wherein:
said wheel handling device is a wheel balancer having a central balancing mechanism;
the central hole in said plate is adapted for engaging the central balancing mechanism of the wheel balancer when a wheel and the adapter are placed in abutment upon the wheel balancer;
said first plurality of means comprises at least three elements for engaging at least three lug holes of a Volkswagon or Porsche wheel, one of said elements being mounted on said first circle generally opposite the other two for engaging one lug hole positioned generally opposite two others;
said second plurality of means comprises at least two elements for engaging at least two lug holes of an eight-lug Pontiac wheel, one of said elements being mounted on said second circle generally opposite the other for engaging one lug hole positioned generally opposite another lug hole;
said adapter includes a third plurality of elements fixedly mounted on said one side of said plate at angularly spaced positions within said first circle to help support the adapter on the central balancing mechanism of the wheel balancer when an eight-lug Pontiac wheel is being balanced; and
said plate and said elements are balanced in weight around the central hole in the plate.

10. A wheel mounting adapter for mounting a wheel on a central balancing mechanism of a bubble wheel balancer, said wheel mounting adapter comprising a circular plate having a central hole therein for retractably engaging the central balancing mechanism of the bubble wheel balancer when the wheel is mounted upon the bubble wheel balancer by the adapter, and a first plurality of means mounted on one side of said plate at angularly spaced positions along a first circle for engaging a plurality of lug holes in the rim of the wheel when the wheel is mounted upon the bubble wheel balancer by the adapter said plate and said means being balanced in weight around the central hole in the plate.

11. A wheel mounting adapter as in claim 10 further comprising a second plurality of means mounted on the other side of said plate at angularly spaced positions along a second circle for engaging a plurality of lug holes in the rim of a different wheel when that wheel is mounted upon the bubble wheel balancer by the adapter.

12. A wheel mounting adapter as in claim 11 still further comprising a third plurality of means mounted on said one side of said plate at spaced positions within said first circle to help support the adapter on the bubble wheel balancer when said different wheel is being balanced.

13. A wheel mounting adapter as in claim 12 wherein said first plurality of means comprises a plurality of members fixedly mounted on said one side of said plate at angularly spaced positions along said first circle, said second plurality of means comprises another plurality of members fixedly mounted on said other side of said plate at angularly spaced positions along said second circle, and said third plurality of means comprises still another plurality of members fixedly mounted on said one side of said plate at angularly spaced positions along a third circle within said first circle.

14. A wheel mounting adapter as in claim 10 further comprising a second plurality of means mounted on the other side of said plate at spaced positions for supporting the adapter on the bubble wheel balancer.

15. A wheel mounting adapter as in claim 14 wherein said first plurality of means comprises a plurality of members fixedly mounted on said one side of said plate at angularly spaced positions along said first circle, and said second plurality of means comprises another plurality of members fixedly mounted on said other side of said plate at angularly spaced positions along a second circle within said first circle.

UNITED STATES PATENT OFFICE
CERTIFICATE OF CORRECTION

Patent No. 3,580,320  Dated May 25, 1971

Inventor(s) Warren A. Roberts

It is certified that error appears in the above-identified patent and that said Letters Patent are hereby corrected as shown below:

Column 1, line 59, "to" should read --of--;

Column 2, line 15, "elevation" should read --elevational--;

Column 2, line 75, "five-eights" should read --five-eighths--;

Column 4, line 9, "1 9/64" should read --one and nine-sixty-fourths--;

Column 4, line 11, immediately before "closest" insert --two--;

Column 4, line 31, "68" should read --66--;

Column 5, line 7, "3" should read --2--; and

Column 6, line 14, immediately after "adapter" insert --,--.

Signed and sealed this 11th day of January 1972.

(SEAL)

Attest:

EDWARD M. FLETCHER, JR.  
Attesting Officer

ROBERT GOTTSCHALK  
Acting Commissioner of Patents